United States Patent
Schall et al.

[11] Patent Number: 5,900,219
[45] Date of Patent: May 4, 1999

[54] GENERATOR AND PROCESS FOR GENERATING A PRODUCT GAS

[75] Inventors: Wolfgang Schall, Waldenbuch; Willy L. Bohn, Stuttgart, both of Germany

[73] Assignee: Deutsche Forschungsanstalt fuer Luft -ung Raumfahrt e.V., Bonn, Germany

[21] Appl. No.: 08/690,331

[22] Filed: Jul. 25, 1996

Related U.S. Application Data

[63] Continuation of application No. PCT/EP95/04672, Nov. 28, 1995.

[30] Foreign Application Priority Data

Nov. 29, 1994 [DE] Germany ............... 44 42 463

[51] Int. Cl.$^6$ ............ B01F 00/00; C01B 13/00; A61L 9/00; A62B 7/08
[52] U.S. Cl. ............ 422/224; 423/579; 422/229; 422/306; 422/120
[58] Field of Search ............ 422/224, 229, 422/306, 120; 423/579

[56] References Cited

U.S. PATENT DOCUMENTS

| | | | |
|---|---|---|---|
| 3,294,378 | 12/1966 | Grimes | 261/92 |
| 4,342,116 | 7/1982 | MacKnight et al. | 372/89 |
| 4,643,889 | 2/1987 | Uchiyama et al. | 423/579 |
| 5,229,100 | 7/1993 | Harpole | 423/579 |
| 5,246,673 | 9/1993 | Hed | 422/224 |
| 5,279,512 | 1/1994 | Manale | 446/217 |

FOREIGN PATENT DOCUMENTS 614 175  5/1935  Germany .

OTHER PUBLICATIONS

*Patent Abstracts of Japan*, "Apparatus for Treating Organic Waste Gas", JP61216717, vol. 11 No. 53, Feb. 19, 1987.
*Patent Abstracts of Japan*, "Iodine Laser Device", JP1200685, vol. 13, No. 496, Nov. 9, 1989.
"The Chemically Pumped Oxygen–Iodine Laser", P.V. Avizonis, et al., SPIE vol. 1225 High–Power Gas Lasers (1990), pp. 448–477.
"Highly efficient jet $O_2(^1\Delta)$ generator", Zagidullin, et al., Soviet Journal of Quantum Electronics, 21 (1991) Jul., No. 7, New York, U.S., pp. 747–753.

*Primary Examiner*—Jeffrey Stucker
*Assistant Examiner*—Hankyel T. Park
*Attorney, Agent, or Firm*—Barry R. Lipsitz; Ralph F. Hoppin

[57] ABSTRACT

In order to improve a generator for generating a product gas by means of a chemical reaction between an educt gas and a liquid, comprising a closed reaction chamber with a liquid supply, a liquid discharge, an educt gas supply, a product gas discharge, a liquid bath arranged within the reaction chamber and a substrate member arranged for rotation in the reaction chamber, the axis of rotation of this substrate member being arranged such that during a rotation of the substrate member at least part of the surface of the substrate member alternatingly dips into the liquid bath and emerges from the liquid bath wetted by the liquid, such that a motor arranged outside the reaction chamber for rotating the substrate member can be dispensed with and the requirement of a pressure-tight passage for a drive shaft of the substrate member through a wall of the reaction chamber is not applicable it is suggested that the generator comprise a flow generator for generating a continuous flow of the liquid in the reaction chamber and that the substrate member comprise at least one momentum receiver for receiving part of the momentum of the flow of the liquid and for generating a rotary motion of the substrate member about its axis of rotation.

41 Claims, 6 Drawing Sheets

GENERATOR AND PROCESS FOR GENERATING A PRODUCT GAS

This application is a continuation of International PCT Application No. PCT/EP95/04672, filed on Nov. 28, 1995.

BACKGROUND OF THE INVENTION

The present invention relates to a generator for generating a product gas by means of a chemical reaction between an educt gas and a liquid, comprising a closed reaction chamber with a liquid supply, a liquid discharge, an educt gas supply, a product gas discharge, a liquid bath arranged within the reaction chamber and a substrate member arranged for rotation in the reaction chamber, the axis of rotation of this substrate member being arranged such that during a rotation of the substrate member at least part of the surface of the substrate member alternatingly dips into the liquid bath and emerges from the liquid bath wetted by the liquid.

Generators of this type are known from the literature.

The article of P. V. Avizonis, G. Hasen and K. A. Truesdell, "The Chemically Pumped Oxygen-Iodine Laser", SPIE, Vol. 1225 High-Power Gas Lasers (1990), pages 448 to 476, in particular, discloses a generator of this type for generating electronically excited oxygen gas by means of a chemical reaction between chlorine gas and basic hydrogen peroxide (in short BHP in accordance with the English designation "basic hydrogen peroxide"), whereby the electronically excited oxygen gas is used for operating a chemically pumped oxygen-iodine laser (in short COIL in accordance with the English designation "chemically pumped oxygen-iodine laser").

In this generator, the substrate member comprises a plurality of thin metal disks which are placed in a row on a shaft parallel to one another and approximately half of each disk dips into the BHP. The shaft and, with it, the metal disks are caused to rotate by means of a motor arranged outside the reaction chamber, whereby during a rotation of the metal disks the surface of the metal disks alternatingly dips into the BHP and emerges from this BHP provided with a liquid film consisting of the BHP.

Chlorine gas is blown onto the regions of the metal disks which have emerged parallel to their surface. In this respect, chlorine molecules diffuse several 100 nanometers into the BHP where the chlorine reacts with hydrogen peroxide and the lye to form electronically excited oxygen, water and a chloride.

The resulting, electronically excited oxygen diffuses out of the BHP into a gas volume of the reaction chamber and flows off into a flow channel of the chemically pumped oxygen-iodine laser where iodine vapor is injected into the electronically excited oxygen gas. As a result of collisions of electronically excited oxygen molecules with iodine molecules the latter are dissociated. The excitation energy of additional, electronically excited oxygen molecules is transferred to the resulting iodine atoms by way of collisions almost free of losses.

The excited iodine atoms and the oxygen are expanded by means of a supersonic nozzle into a resonator of the chemically pumped oxygen-iodine laser where the excited iodine atoms release their excitation energy by way of a stimulated emission of photons so that a laser beam results in a known manner.

A disadvantage of the known generator is to be seen in the fact that the substrate member is caused to rotate by a motor arranged outside the reaction chamber so that a complicated construction is required for the passage of the shaft through the wall of the closed reaction chamber. Since the interior of the reaction chamber is generally subjected to a low pressure of, for example, 50 millibars, this passage must be air-tight. In addition, no lubricating grease or oil from the seal may enter the reaction chamber where these substances could react with the BHP.

The object underlying the invention was therefore to improve a generator of the type described at the outset in such a manner that a motor arranged outside the reaction chamber for rotating the substrate member can be dispensed with and the requirement of a pressure-tight passage for a drive shaft of the substrate member through a wall of the reaction chamber is not applicable.

SUMMARY OF THE INVENTION

This object is accomplished in accordance with the invention, in a generator of the type described in the above, in that the generator comprises a flow generator for generating a continuous flow of the liquid in the reaction chamber and that the substrate member comprises at least one momentum receiver for receiving part of the momentum of the flow of the liquid and for generating a rotary motion of the substrate member about its axis of rotation.

The inventive concept offers the advantage that the liquid transfers the momentum required for generating a rotation of the substrate member to this substrate member via the momentum receiver or receivers within the reaction chamber without any gas-tight passage of movable parts through a wall of the reaction chamber being required for this purpose.

In addition, the continuous flow of the liquid in the reaction chamber means that the surface of the substrate member is constantly flushed and wetted by unused liquid so that any enriching of the products of reaction in the liquid wetting the substrate member, which would diminish the yield of the chemical reaction between the educt gas and the liquid, is absent.

Also, heat released during the chemical reaction is carried away by the continuous flow of the liquid and so any heating up of the liquid wetting the substrate member, which would reduce the yield of the chemical reaction, is avoided.

The liquid wetting the substrate member can, for example, be absorbed by a carrier material of the substrate member, fill cavities in a porous carrier material of the substrate member or form isolated droplets on its surface. The liquid wetting the substrate member preferably forms a film of liquid covering the surface thereof.

The generator advantageously comprises a device for generating a continuous flow of the educt gas in the reaction chamber. This means that a sufficient amount of educt gas is always supplied to the liquid wetting the substrate member. Furthermore, the continuous flow of the educt gas generates just such a flow of the product gas due to the gas particles impinging on one another and so the product gas particles resulting during the chemical reaction in the liquid at the surface of the substrate member are quickly carried away.

It is favorable when the substrate member comprises at least one deflecting element for deflecting the flow of the educt gas onto the surface of the substrate member. This means that the educt gas not only flows along outer regions of the substrate member but also flows over more inaccessible regions of the surface of the substrate member even when the substrate member represents a considerable flow resistance.

It is particularly favorable when the deflecting element or elements are designed such that they direct the flow of the educt gas essentially over the entire surface of the substrate member since the yield of the chemical boundary reaction depends on the surface of the liquid wetting the substrate member, over which the educt gas flows, and this surface is, in the specified case, maximum.

The momentum receivers are preferably designed such that they serve at the same time as deflecting elements for deflecting the flow of the educt gas onto the surface of the substrate member. The constructional resources required and the production costs can be reduced by means of such a combination of operations.

In addition, it is of advantage when the substrate member comprises at least one deflecting element for deflecting a flow of the product gas towards the product gas discharge. As a result of such a measure, the product gas can quickly be removed from the reaction chamber. This is of significance, in particular, when the product gas particles are intended, after their formation, to impinge as little as possible on one another and on walls of the substrate member or the reaction chamber. In the case of generating electronically excited oxygen gas this is the case since the electronically excited oxygen molecules lose their excitation energy during such impingements and thus could no longer be used to operate a chemically pumped oxygen-iodine laser.

Preferably, the momentum receiver or receivers of the substrate member also take over the function of deflecting elements for the flow of the product gas, i.e. are designed to deflect a flow of the product gas towards the product gas discharge. The production costs of the generator can be reduced by such a combination of operations.

In order to discharge the product gas as quickly as possible from the reaction chamber, thereby avoiding undesired impingements of the product gas particles on one another and on walls of the reaction chamber or the substrate member, and in order to prevent, to a large extent, educt gas from flowing past the substrate member without reacting on its surface, the shape of the interior of the reaction chamber above the liquid bath arranged within the reaction chamber advantageously conforms to the shape of the substrate member.

No details have so far been given concerning the design of the substrate member.

Any body or member, which can be arranged for rotation in the reaction chamber, the surface of which can be wetted at least partially by the liquid and which can act as momentum receiver or on which at least one momentum receiver can be arranged, can, in principle, be used as substrate member.

It can, for example, be provided for the substrate member to comprise an essentially cylindrical roller.

In contrast to this, an increase in the surface of the substrate member and thus in the area available for the chemical reaction can be achieved when the substrate member comprises disks aligned transversely to its axis of rotation.

An additional increase in the ratio of the surface of the substrate member to its volume results when the substrate member advantageously comprises a plurality of bristles.

No details have so far been given concerning the type of momentum receiver of the substrate member.

It can, for example, be provided for the momentum receiver to comprise at least one guide vane. Such guide vanes can generate the rotation of the substrate member in a similar manner to the blades of a mill wheel.

Above all when the momentum receiver or receivers are intended to deflect a flow of the educt gas and/or a flow of the product gas at the same time, it can be of advantage when the guide vanes are curved in a corresponding manner.

As an alternative or supplementary to the guide vanes, the momentum receiver of the substrate member can also comprise at least one propeller. The rotational speed of the substrate member in relation to the flow rate of the liquid can thereby be influenced by a corresponding bending of the propeller blades.

In addition, it is easier for educt gas to flow around a substrate member with propellers, with such an improved flow adjustment of the substrate member resulting in an increased yield from the chemical reaction.

In addition, the flow of the product gas thereby released can be subjected to angular momentum by the propeller or propellers so that drops of liquid taken along by the flow of product gas are advantageously precipitated out of this flow due to centrifugal forces.

An optimum transfer of momentum from the flow of liquid to the substrate member is achieved when the axis of symmetry of the propeller or propellers is aligned essentially parallel to the direction of the flow of the liquid in the reaction chamber.

As an alternative or supplementary to the momentum receivers described thus far, the substrate member can also comprise a screw as momentum receiver.

In this respect, the axis of the screw is preferably aligned essentially parallel to the axis of rotation of the substrate member and parallel to the direction of the flow of the liquid in the reaction chamber.

The substrate member provided with such a screw is caused to rotate by the liquid flowing along the axis of rotation in a reversal of the principle of a screw pump ("Archimedes' screw").

If the flow of the liquid within the reaction chamber is favorably directed such that the liquid is pressed downwards when it flows against the helical surface of the screw, this can prevent the liquid from flowing over into the product gas discharge.

No details have so far been given concerning the alignment of the flow of the educt gas relative to the axis of rotation of the substrate member.

It can, for example, be provided for the generator to comprise a device for generating a flow of the educt gas entering the reaction chamber essentially parallel to the axis of rotation of the substrate member. If the flow of educt gas is guided in this way, it can be blown evenly against the propeller blades or the helical surface of the screw, in particular, when the substrate member is provided with propellers or a screw.

It may, however, be more favorable, particularly with high flow rates of the educt gas, for the generator to comprise a device for generating a flow of the educt gas entering the reaction chamber essentially transversely to the axis of rotation of the substrate member.

In the case of a substrate member provided with a screw, the educt gas can be blown in, in particular, parallel to the helical surface of the screw, i.e. turned through the pitch angle of the screw in relation to a plane at right angles to the screw axis, in order to obtain a flow of educt gas which is adapted in an optimum manner to the geometry of the screw.

Furthermore, it is of advantage when the generator comprises a plurality of substrate members arranged for rotation in the reaction chamber. This results in the possibility of coordinating the type and design of the momentum receivers or the deflecting elements to flow ratios of the liquid, the educt gas and/or the product gas varying locally within the reaction chamber.

In this respect, it can be provided for the generator to comprise at least two substrate members with axes of rotation parallel to one another.

These two substrate members with axes of rotation parallel to one another can comprise momentum receivers for generating a rotation of the substrate members in the same direction or, alternatively thereto, momentum receivers for generating a rotation of the substrate members in opposite directions.

When the substrate members are rotated in the same direction, angular momentum imparted to the flow of educt or product gas by deflecting elements arranged on the substrate members is maintained or increased.

When the two substrate members are rotated in opposite directions, it can, on the other hand, be provided that the substrate members rotating in opposite directions each comprise at least one deflecting element for deflecting the flow of gas, these elements being designed such that the deflecting element or elements of the one substrate member impart to the flow of gas a deflection momentum which is directed contrary to a deflection momentum imparted to the flow of gas by the deflecting element or elements of the other substrate member.

In this way, it is possible to prevent a rotating flow of gas occurring at the product gas discharge. This is desirable, in particular, when a flow channel is connected to the product gas discharge, in which an even, interference-free flow of the product gas is intended to be generated.

The inventive generator is particularly suitable for generating an electronically excited oxygen gas (product gas) by means of a chemical reaction between chlorine gas (educt gas) and hydrogen peroxide (liquid) dissolved in a lye (for example, potassium hydroxide).

A preferred development of the invention relates to a chemically pumped oxygen-iodine laser which is operated by excitation energy transferred from electronically excited oxygen gas to iodine atoms, wherein the chemically pumped oxygen-iodine laser comprises an inventive generator for generating the electronically excited oxygen gas.

Furthermore, the invention also relates to a process for generating a product gas by means of a chemical reaction between an educt gas and a liquid, in which the educt gas and the liquid are supplied to and the product gas and the liquid removed from a closed reaction chamber and a substrate member is rotated about an axis of rotation in the reaction chamber such that during a rotation of the substrate member at least part of the surface thereof alternatingly dips into a liquid bath arranged within the reaction chamber and emerges from the liquid bath wetted by the liquid, with which the object underlying the invention is accomplished in that a continuous flow of the liquid in the reaction chamber is generated and that by means of at least one momentum receiver arranged on the substrate member part of the momentum of the flow of the liquid is taken therefrom in order to activate the rotary motion of the substrate member.

The advantage of the inventive process is to be seen in the fact that for activating the rotary motion of the substrate member no movable parts have to be guided through a wall of the reaction chamber and so no problems whatsoever can result due to sealing or lubricating agents entering the reaction chamber.

Additional, advantageous developments of the inventive process as well as a preferred use thereof are also disclosed, the advantages of which have already been specified in conjunction with the advantageous developments of the inventive generator.

Additional features and advantages of the invention are the subject matter of the following description and the drawings of several embodiments.

DETAILED DESCRIPTION OF THE INVENTION

Figure 1:
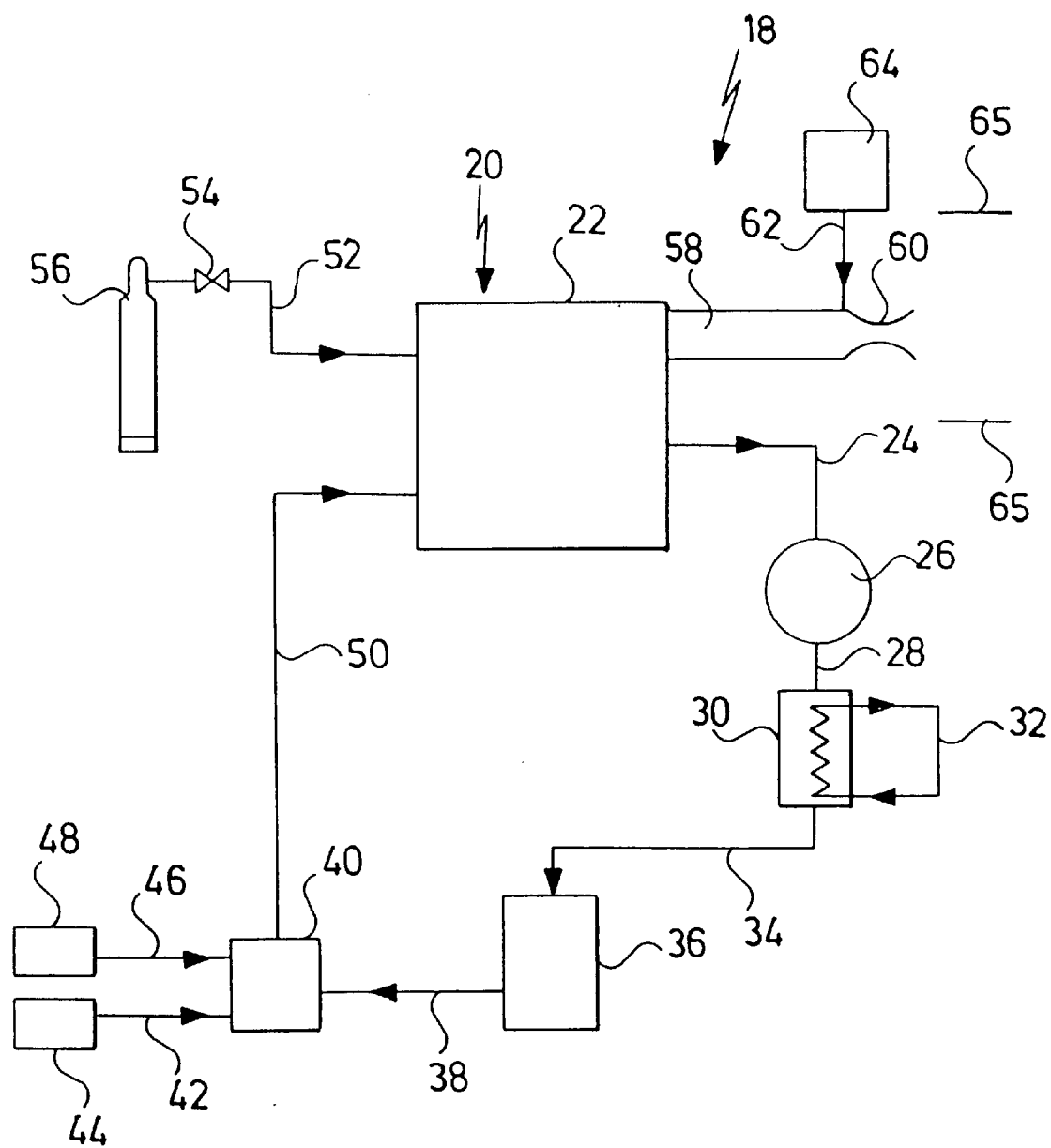
FIG. 1 is a schematic illustration of an inventive, chemically pumped oxygen-iodine laser with an inventive generator for generating electronically excited gaseous oxygen by means of a chemical reaction between gaseous chlorine and liquid BHP, in this case a solution of hydrogen peroxide in potassium hydroxide.

Identical or functionally equivalent elements are designated with the same reference numerals in all the Figures.

A chemically pumped oxygen-iodine laser illustrated in FIG. 1 and designated as a whole as 18 comprises a generator designated as a whole as 20 for generating electronically excited oxygen gas (product gas) by means of a chemical reaction between gaseous chlorine (educt gas) and the liquid BHP, this generator, for its part, comprising a reaction chamber 22 which is illustrated schematically in FIG. 1 and will be described in detail further on.

The reaction chamber 22 is connected by means of a liquid discharge line 24, through which BHP can be removed from the reaction chamber 22, with a pump 26 for increasing pressure.

An intermediate line 28 leads from the pump 26 for increasing pressure to a heat exchanger 30 which has BHP flowing through it on the warm side and on the cold side a coolant conveyed in a conventional coolant circuit 32.

The heat exchanger 30 is connected via an additional intermediate line 34 with a separator 36 for separating potassium chloride and water out of the BHP and an intermediate line 38 again leads from this separator to a mixing tank 40.

The mixing tank 40 is connected via a supply line for potassium hydroxide 42 with a storage means for potassium hydroxide 44 and via a supply line for hydrogen peroxide 46 with a storage means for hydrogen peroxide 48 in order to add potassium hydroxide and hydrogen peroxide to the BHP flowing through it.

A liquid return line 50 leads from the mixing tank 40 back to the reaction chamber 22, whereby a closed circuit for BHP results.

Furthermore, the reaction chamber 22 is connected via an educt gas supply line 52, which has a flow-limiting valve 54, with an educt gas storage means 56, for example a chlorine gas bottle.

Moreover, the reaction chamber 22 is connected to a flow channel 58 of the chemically pumped oxygen-iodine laser 18 which has a supersonic nozzle 60 at its end facing away from the reaction chamber 22.

An iodine vapor line 62, the free end of which is connected with an iodine vapor generator 64, opens into the nozzle 60.

The nozzle 60 opens, for its part, into a laser resonator limited by two mirrors 65 which are coaxial to one another and the common axis of which is aligned at right angles to the axis of the nozzle 60.

Figure 2:
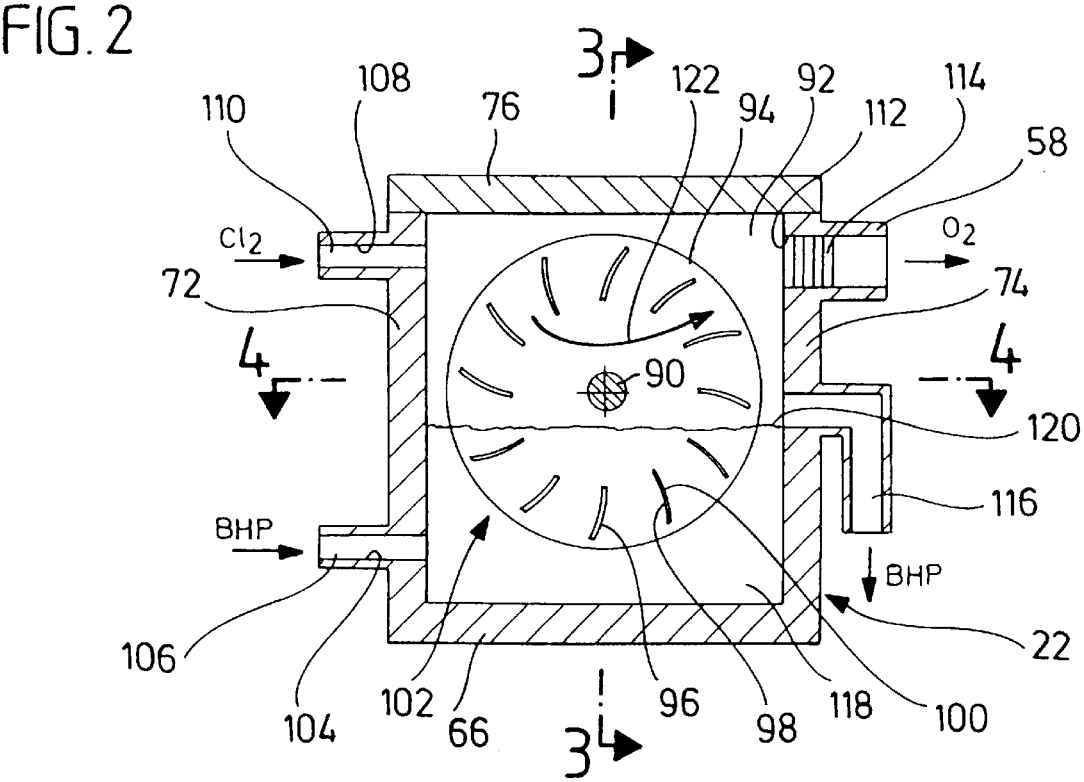
FIG. 2 is a longitudinal section through the reaction chamber of a first embodiment of the inventive generator for generating electronically excited gaseous oxygen, the substrate member of which comprises a plurality of circular disks aligned parallel to one another.
Figure 3:
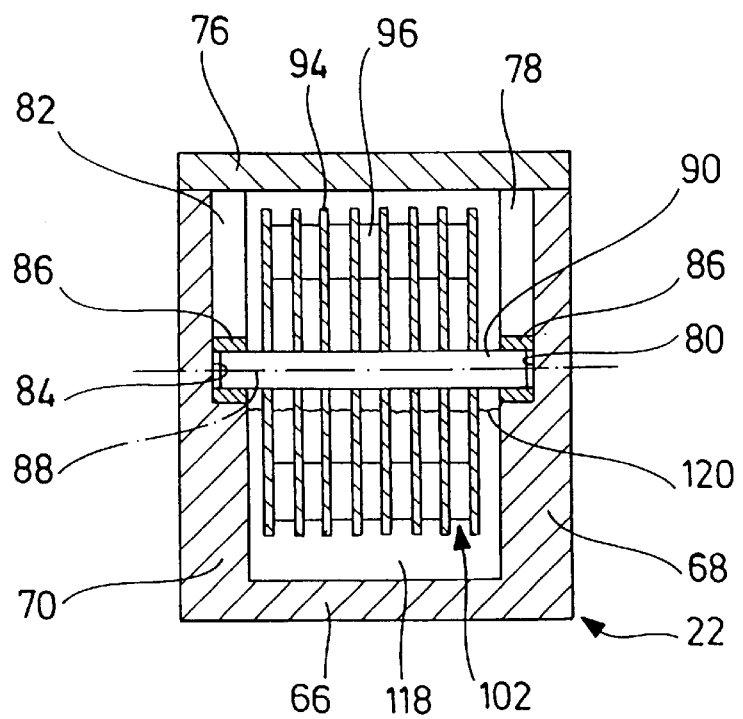
FIG. 3 is a section through the reaction chamber of the first embodiment of the inventive generator along line 3—3 in FIG. 2.
Figure 4:
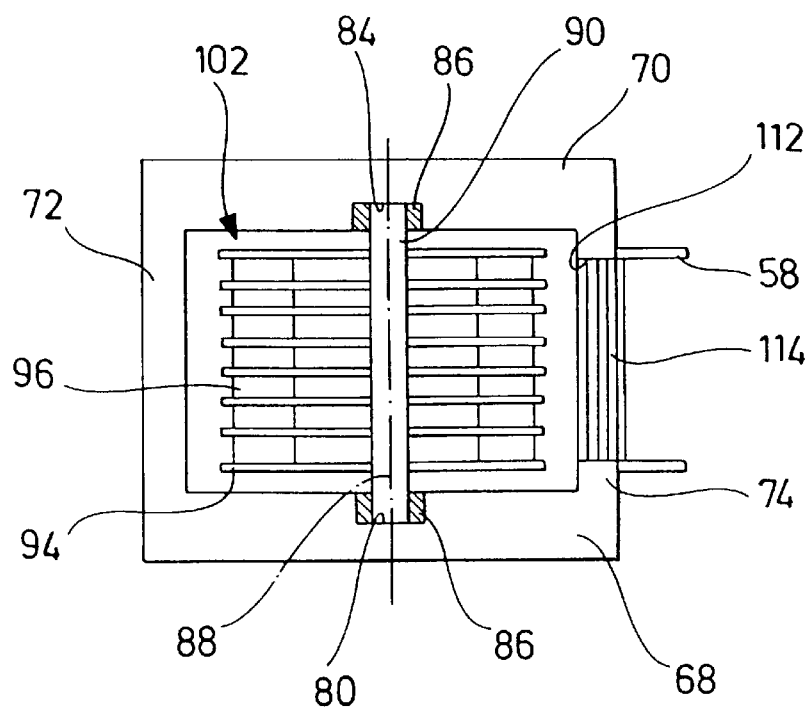
FIG. 4 is a section through the reaction chamber of the first embodiment of the inventive generator along line 4—4 in FIG. 2.

The construction of the reaction chamber 22 according to a first embodiment of the inventive generator 20 is illustrated in more detail in FIGS. 2 to 4.

The reaction chamber 22 has the shape of a hollow parallelepiped with a base 66, a front side wall 68, a rear side wall 70, a left side wall 72, a right side wall 74 as well as a cover 76. The base 66 and the side walls 68, 70, 72 and 74 are connected with one another in one piece; the cover 76 can be removed and in its closed position connected in a gas-tight manner with the side walls 68, 70, 72 and 74.

All the walls 66, 68, 70, 72, 74 and 76 of the reaction chamber 22 consist of a material which reacts to as small an extent as possible with the BHP and with chlorine gas and is solubilized by the BHP only a little or not at all.

The front side wall 68 has on its inner side a recess 78 with a rectangular cross section which extends from the center of the upper edge of the front side wall 68 vertically as far as approximately the center of the inner side of the front side wall 68 where it opens into a recessed end region 80 which has the shape of a downwardly curving, halved circular cylinder, the cut surface of which is aligned horizontally and its axis at right angles to the front side wall 68. Depth and diameter of the end region 80 correspond to the depth and the width, respectively, of the recess 78.

The rear side wall 70 also has at its inner side a recess 82 with an end region 84 which are designed in accordance with the recess 78 and the end region 80, respectively, and are located opposite these in mirror image.

The boundary wall of each of the end regions 80, 84 bears a hollow-cylindrical bearing bushing 86, the external diameter of which is slightly smaller than the diameter of the end regions 80 and 84, respectively. The common axis of the bearing bushings 86 is aligned at right angles to the front side wall 68 and to the rear side wall 70.

A shaft 90 which is mounted at its two ends in the bearing bushings 86 for rotation about an axis of rotation 88 extends from the front side wall 68 to the rear side wall 70 through an interior 92 of the reaction chamber 22 which is enclosed by the walls 66, 68, 70, 72, 74 and 76 of the reaction chamber 22.

The shaft 90 passes through several, for example, eight flat, circular-cylindrical disks 94 which are coaxial to the shaft 90 and non-rotatably connected to the shaft 90. All the disks 94 have the same thickness and the same diameter which is somewhat smaller than the width of the inner side of the front side wall 68. The disks 94 are arranged along the shaft 90 at equal distances from one another.

Guide vanes 96 are arranged between the disks 94 and extend in the direction of the axis of rotation 88 from one end face of a disk 94 to the end face of an adjacent disk 94 facing this first disk and in radial direction from almost the outer circumference of the disks 94 towards the shaft 90 by approximately a quarter of the diameter of the disks 94. The guide vanes 96 are thereby curved in planes parallel to the end faces of the disks 94 so that the guide vanes 96 each have a concave front side 98 and a convex rear side 100. Their concave front sides 98 point upwards in the half of the interior 92 facing the left side wall 72 of the reaction chamber whereas they point downwards in the half of the interior 92 facing the right side wall 74 of the reaction chamber 22.

Twelve guide vanes 96 are, for example, arranged between every two adjacent disks 94, the angular distance between adjacent guide vanes 96 being constant in relation to the axis of rotation 88.

The shaft 90, the disks 94 and the guide vanes 96 together form a substrate member 102.

The left side wall 72 has several inlet bores for BHP 104 passing through it near to its lower edge and at right angles to its surface, these bores being arranged at equal distances along the entire width of the inner side of the left side wall 72. The inlet bores for BHP 104 are connected to the liquid return line 50 via inlet pipes 106 and a branch pipe (not illustrated).

In addition, the left side wall 72 has several inlet bores for chlorine gas 108 passing through it near to its upper edge and at right angles to its surface, these bores being arranged at equal distances along the entire width of the inner side of the left side wall 72. The inlet bores for chlorine gas 108 are connected to the educt gas supply line 52 via inlet pipes 110 and a branch pipe (not illustrated).

The right side wall 74 has near to its upper edge an outlet opening for oxygen gas 112 which extends over almost the entire width of the inner side of the right side wall 74 and is connected in a gas-tight manner to the flow channel 58 of the chemically pumped oxygen-iodine laser 18.

A drop separator 114 is arranged in the outlet opening for oxygen gas 112 for separating drops of liquid out of the flow of gas.

In addition, the right side wall 74 has an overflow opening 116, the lower edge of which is arranged at a somewhat lower level than a lower edge of the shaft 90. The overflow opening 116 is connected to the liquid discharge line 24.

A lower region of the interior 92 of the reaction chamber 22 is taken up by a liquid bath 118 consisting of BHP, the level of liquid 120 in which is at the same height as the lower edge of the overflow opening 116 and into which the lower regions of the disks 94 of the substrate member 102 dip with the guide vanes 96 arranged on these regions.

During operation of the generator 20 for generating electronically excited oxygen, a circulation of BHP from the reaction chamber 22 through the heat exchanger 30, the separator 36 and the mixing tank 40 and back into the reaction chamber 22 is maintained by means of the pump 26 for increasing pressure.

This means that a flow of BHP directed from the inlet bores for BHP 104 towards the overflow opening 116 results within the liquid bath 118 in the reaction chamber 22. The curved guide vanes 96 which are located within the liquid bath 118 have the BHP flowing against their concave front sides 98, take up part of the momentum of the liquid flow and transfer it to the substrate member 102 which is thereby caused to rotate about the axis of rotation 88 (in FIG. 2 contrary to the clockwise direction). The rotative speed of the substrate member 102 thereby depends on the throughput of BHP through the reaction chamber 22 per unit of time and thus on the mass throughput through the pump 26 for increasing pressure.

Favorable rotational speeds are, for example, in the range of 10 to 100 revolutions per minute since with such comparatively low rotational speeds the friction in the bearing bushings 86 is relatively low and so unlubricated plastic journal-bearing bushings can be used.

During the course of a rotation of the substrate member 102 about the axis of rotation 88, each of the guide vanes 96 and the greatest part of the surface of the disks 94 dips into the liquid bath 118 so that these are wetted by the viscous BHP and a thin BHP liquid film remains on the regions of the substrate member 102 emerging from the liquid bath 118.

Chlorine gas flowing into the upper region of the interior 92 of the reaction chamber 22 from the educt gas storage means 56 when the valve 54 is opened and through the educt gas supply line 52, the branch pipe (not illustrated), the inlet pipes 110 and the inlet bores for chlorine gas 108 flows against the convex rear sides 100 of those guide vanes 96 which are just located outside the liquid bath 118 and is deflected by them towards the axis of rotation 88. This means that a sufficient amount of chlorine gas passes not only over the regions of the disks 94 close to their circumference but also over their regions close to the axis of rotation. The flow of gas guided by means of the guide vanes 96 acting as deflecting elements is indicated in FIG. 2 by the arrow 120.

During the course of a complete rotation of the substrate member 102, chlorine gas flows over essentially the entire surface of the substrate member 102 due to the deflection of the flow of chlorine gas towards the axis of rotation 88, which would not be the case without the guide vanes 96 acting as deflecting elements, in particular with only a slight distance between the disks 94.

While flowing past the surface of the substrate member 102, chlorine molecules diffuse several hundred nanometers into the liquid film coating the surface of the substrate member and react with the hydrogen peroxide contained in the BHP and the potassium hydroxide according to the reaction:

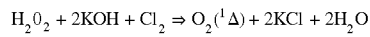

$$H_2O_2 + 2KOH + Cl_2 \Rightarrow O_2(^1\Delta) + 2KCl + 2H_2O$$

to form electronically excited oxygen, potassium chloride and water.

The oxygen results mainly in the desired, electronically excited form when the partial pressure of the chlorine gas in the interior 92 of the reaction chamber 22 is very low, for example several millibars. If a higher total gas pressure of, for example, at least 50 millibars is required in the interior 92 of the reaction chamber 22 in order to generate a desired flow of gas at the supersonic nozzle 60, this total gas pressure can be achieved by adding an inert gas to the chlorine gas.

The electronically excited oxygen resulting during the chemical reaction specified above diffuses out of the liquid film on the surface of the substrate member, flows towards the right side wall 74 and passes through the outlet opening for oxygen gas 112 into the flow channel 58 of the chemically pumped oxygen-iodine laser 18, whereby drops of liquid taken along by the flow of gas are retained by the drop separator 114. The electronically excited oxygen gas flows out of the flow channel 58, where necessary with an added inert gas, through the supersonic nozzle 60 into the laser resonator of the chemically pumped oxygen-iodine laser 18, whereby a supersonic flow results.

Iodine vapor is injected into the flow of electronically excited oxygen from the iodine vapor generator 64 via the iodine vapor supply line 62, whereupon the molecules of the iodine vapor dissociate due to collisions with electronically excited oxygen molecules. Due to collisions with additional, electronically excited oxygen molecules, the resulting iodine atoms take over their excitation energy almost without loss and, for their part, pass into an electronically excited state, from which the transition into a lower energy state takes place within the laser resonator as a result of a stimulated emission of photons. Thus, a coherent radiation field results in a known manner between the mirrors 65, from which a laser beam is emitted through one of the mirrors 65, which is partially permeable.

Chloride ions as well as water molecules are enriched in the BHP due to the reaction for generating electronically excited oxygen specified above. In addition, considerable thermal energy, which heats up the BHP, is released during this reaction. When the temperature increases, the hydrogen peroxide does, however, degrade. For a continuous generation of electronically excited oxygen, the BHP must, therefore, be cooled and regenerated continuously.

This is done by having BHP exiting from the reaction chamber 22 through the overflow opening 116 conveyed by the pump 26 for increasing pressure through the liquid discharge line 24 and the intermediate line 28 into the heat exchanger 30 where the heat of reaction is removed from the BHP due to heat exchange according to the counterflow principle with a coolant which, for its part, is cooled in a conventional coolant circuit 32.

Thereafter, the BHP passes through the intermediate line 34 into the separator 36 where the potassium chloride and water resulting during the chemical reaction specified above are removed from the BHP.

It is favorable to arrange the separator 36 behind the heat exchanger 30 in flow direction since the salt dissolved in the BHP precipitates more easily after the BHP has been cooled in the heat exchanger 30.

The BHP freed from the products of reaction passes via the intermediate line 38 into the mixing tank 40 where potassium hydroxide from the storage means for potassium hydroxide 44 is added to it via the supply line for potassium hydroxide 42 and likewise hydrogen peroxide from the storage means for hydrogen peroxide 48 via the supply line for hydrogen peroxide 46 in order to replace the hydrogen peroxide used up in the reaction specified above and the used potassium hydroxide.

The BHP cooled and regenerated in this manner flows back into the reaction chamber 22 via the liquid return line 50.

The substrate member 102 can be removed from the interior 92 of the reaction chamber 22 for cleaning purposes or for exchanging it for another substrate member 102 once the cover 76 has been removed by moving the shaft 90, with the bearing bushings 86 bearing it, upwards out of the reaction chamber 22 through the recesses 78 and 82.

Figure 5:
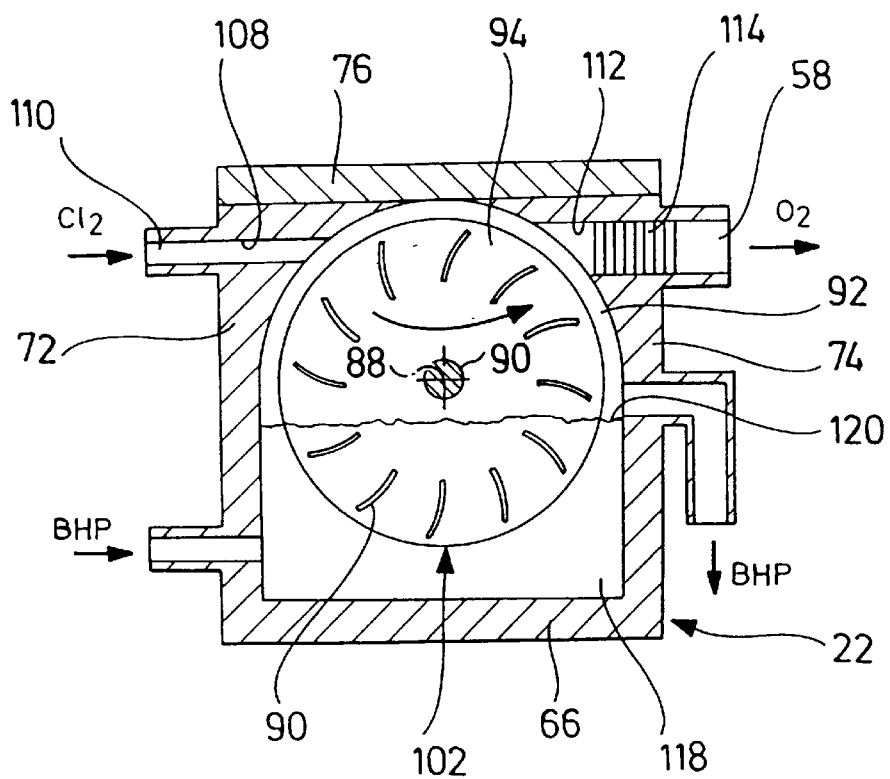
FIG. 5 is a section similar to FIG. 2 through the reaction chamber of a second embodiment of the inventive generator, in which the interior of the reaction chamber is adapted to the substrate member.

A second embodiment of the inventive generator 20 for generating electronically excited oxygen which is illustrated in FIG. 5 in conjunction with FIG. 1 differs from the first embodiment illustrated in FIGS. 1 to 4 in that the inner sides of the left side wall 72 and of the right side wall 74 are not plane but project towards the substrate member 102 above the level of liquid 120 in such a manner that they form sections from the cylindrical surface of a circular cylinder, the axis of which coincides with the axis of rotation 88 and the diameter of which is slightly larger than the diameter of the disks 94.

As a result of this design of the side walls 72 and 74, it is possible for the flow of chlorine gas exiting from the inlet bores for chlorine gas 108 to be picked up immediately by the guide vanes 96 and distributed over the surface of the disks 94 and for the flow of oxygen gas resulting due to a chemical reaction to be likewise directed by the guide vanes 96 immediately into the exit opening for oxygen gas 112 without the possibility of turbulences resulting in corners of the interior 92 of the reaction chamber 22.

Moreover, the path of the electronically excited oxygen gas resulting due to a chemical reaction into the flow channel 58 is shortened so that the loss of electronically excited oxygen molecules due to de-excitation during collisions amongst these molecules is reduced.

Furthermore, the wall area of the interior 92 located above the level of liquid 120 is decreased in comparison with the first embodiment of the inventive generator 20 and so the loss of electronically excited oxygen molecules due to collisions with the walls 68, 70, 72, 74 or 76 of the reaction chamber 22 is also reduced.

As for the rest, the second embodiment of the inventive generator 20 illustrated in FIG. 5 in conjunction with FIG. 1 corresponds with respect to construction and function to the first embodiment of the inventive generator illustrated in FIGS. 1 to 4.

Figure 6:
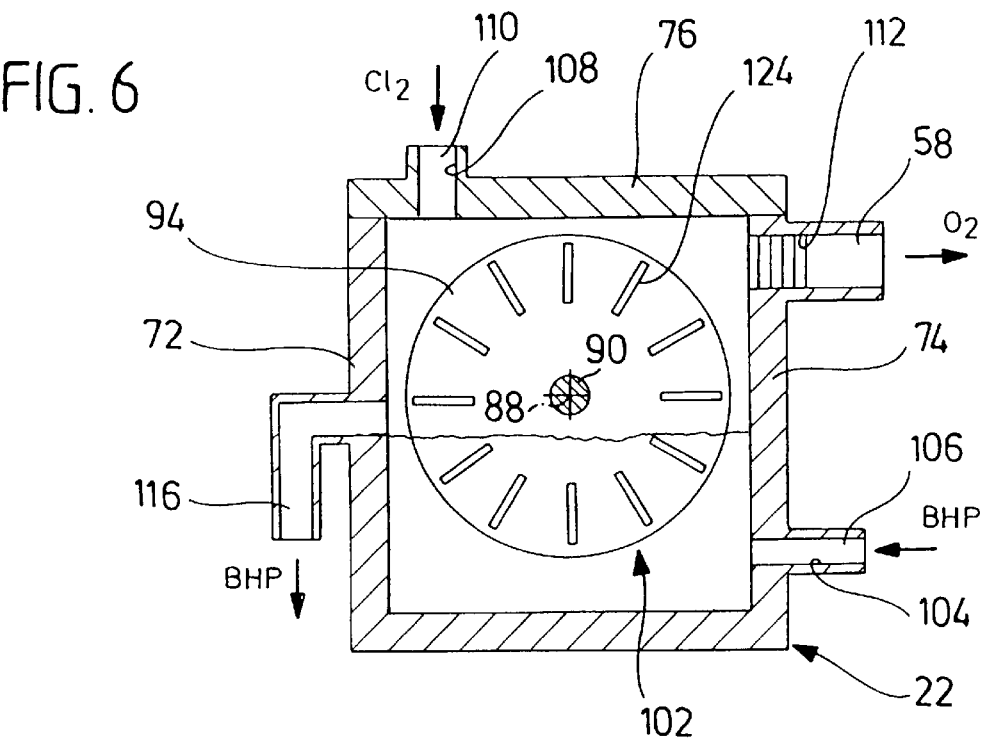
FIG. 6 is a section similar to FIG. 2 through the reaction chamber of a third embodiment of the inventive generator, the substrate member of which comprises plane baffle plates as momentum receivers.

A third embodiment of the inventive generator 20 for generating electronically excited oxygen which is illustrated in FIG. 6 in conjunction with FIG. 1 differs from the first embodiment illustrated in FIGS. 1 to 4 in that the inlet bores for chlorine gas 108 are not arranged in the left side wall 72 but penetrate the cover 76 vertically close to the left side wall 72.

In addition, the inlet bores for BHP 104 and the overflow opening 116 are arranged in reverse mirror image in comparison with the first embodiment of the inventive generator 20 illustrated in FIG. 2 and so in the third embodiment the inlet bores for BHP 104 are arranged in the right side wall 74 and the overflow opening 116 in the left side wall 72 of the reaction chamber 22.

The direction of flow of the BHP in the liquid bath 118 and, therefore, the direction of rotation of the substrate member 102 are thus reversed in comparison with the conditions illustrated in FIG. 2.

In this third embodiment of the generator 20, the chlorine gas exits the inlet bores for chlorine gas 108 essentially at right angles to the inflow direction of the BHP and enters the reaction chamber 22 at right angles to the outflow direction of the oxygen gas.

With this relative arrangement of the inlet bores for chlorine gas 108, the inlet bores for BHP 104 as well as the exit opening for oxygen gas 112, the desired deflection of the flow of gas over the surface of the substrate member 102 can also be achieved with plane guide vanes 124, whereby the plane guide vanes 124 extend, like the curved guide vanes 96 of the first embodiment, in the direction of the axis of rotation 88 from an end face of one of the disks 94 towards the end face of an adjacent disk 94 facing this first disk and from the outer circumference of the disks 94 towards the axis of rotation 88.

As for the rest, the third embodiment of the inventive generator 20 illustrated in FIG. 6 in conjunction with FIG. 1 corresponds with respect to construction and function to the first embodiment illustrated in FIGS. 1 to 4.

Figure 7:
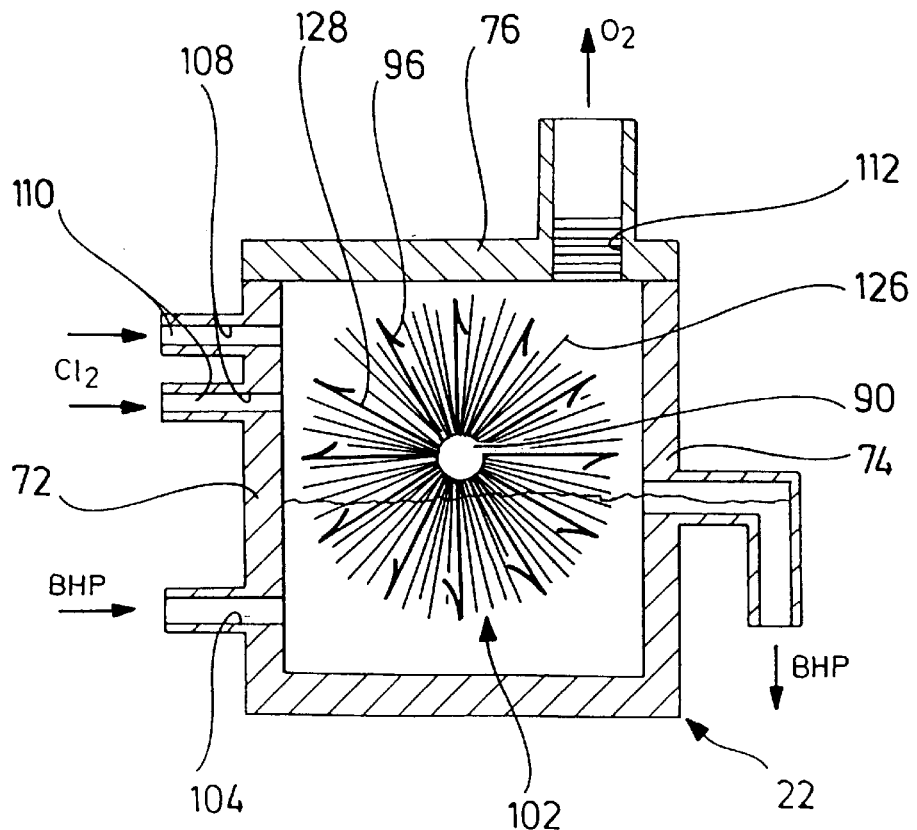
FIG. 7 is a section similar to FIG. 2 through the reaction chamber of a fourth embodiment of the inventive generator, the substrate member of which comprises bristles.

A fourth embodiment of the inventive generator 20 for generating electronically excited oxygen which is illustrated in FIG. 7 in conjunction with FIG. 1 differs from the embodiment illustrated in FIGS. 1 to 4 in that the substrate member 102 does not comprise any disks 94 arranged on the shaft 90 but bristles 126, for example, wires or rods which project essentially radially from the shaft 90 and are non-rotatably connected to this shaft.

In comparison with the disks 94, the bristles 126 offer the advantage that they have a greater surface per volume and, therefore, a larger surface of the substrate member 102 is coated with a film of BHP during the rotation of the substrate member and so a greater boundary surface is available for the boundary reaction specified above.

Since the flow resistance of the bristles 126 is too low to remove from the flow of liquid the momentum required for maintaining the rotation of the substrate member 102, and since, in this embodiment as well, a deflection of the flow of chlorine gas over the entire surface of the substrate member 102 where possible is desirable, the substrate member 102 also comprises curved guide vanes 96 which can be designed and arranged, for example, in the same way as the guide vanes 96 described in conjunction with the first embodiment of the inventive generator 20.

Instead of by the disks 94, the guide vanes 96 of the fourth embodiment of the inventive generator 20 illustrated in FIG. 7 are held by holding rods 128 non-rotatably arranged on the shaft 90 and projecting radially therefrom.

In this fourth embodiment, the inlet bores for chlorine gas 108 and the outlet opening for oxygen gas 112 can, in principle, be arranged in the same way as in the first embodiment of the inventive generator illustrated in FIG. 2 or the third embodiment illustrated in FIG. 6.

As an alternative or in addition thereto, it can, however, be provided, for example, for several inlet bores for chlorine gas 108 which penetrate the left side wall 72, which has the inlet bores for BHP 104, at right angles to its surface to be arranged one above the other and connected to the educt gas supply line 52 by means of inlet pipes 110 and a branch pipe (not illustrated).

In addition, it can be provided, as illustrated in FIG. 7, for the outlet opening for oxygen gas 112 not to be arranged in the right side wall 74 but close to the right side wall 74 in the cover 76.

As for the rest, the fourth embodiment of the inventive generator 20 corresponds with respect to construction and function to the first embodiment illustrated in FIGS. 1 to 4.

Figure 8:
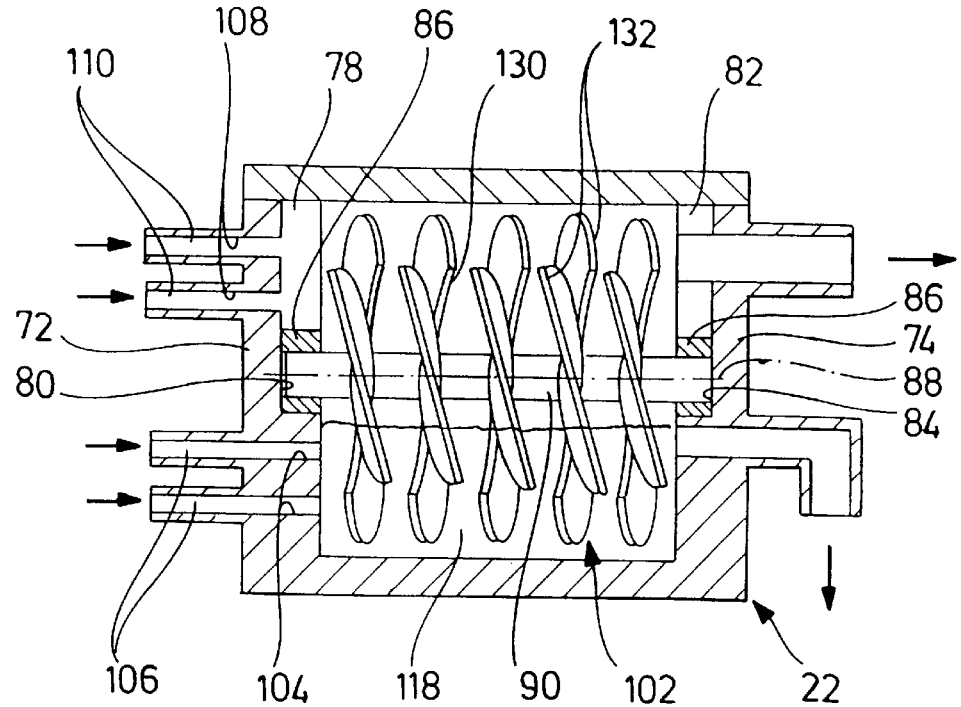
FIG. 8 is a section similar to FIG. 2 through the reaction chamber of a fifth embodiment of the inventive generator, the substrate member of which comprises propellers as momentum receivers.

A fifth embodiment of the inventive generator 20 for generating electronically excited oxygen which is illustrated in FIG. 8 in conjunction with FIG. 1 differs from the first embodiment illustrated in FIGS. 1 to 4 in that the axis of rotation 88 of the substrate member 102 is not aligned transversely to the inlet bores for BHP 104 but parallel thereto and, therefore, to the direction of flow of the BHP in the liquid bath 118.

In this embodiment, the inner side of the left side wall 72 therefore has a recess 78 with a rectangular cross section which extends from the center of the upper edge of the left side wall 72 vertically downwards and approximately as far as the center of the inner side of the left side wall 72 where it opens into a semi-cylindrical end region 80. The right side wall 74 has, in mirror image to the recess 78 and the end region 80, a recess 82 with a rectangular cross section which extends from the center of the upper edge of the right side wall 74 vertically downwards and approximately as far as the center of the inner side of the right side wall 74 and opens into a semi-cylindrical end region 84.

The end regions 80 and 84 each bear one of the two bearing bushings 86, in which one respective end of the shaft 90 is mounted for rotation about the horizontal axis of rotation 88.

The recesses 78, 82 and end regions 80, 84 provided in the embodiments illustrated in FIGS. 2 to 7 in the front side wall 68 and the rear side wall 70, respectively, can be omitted.

The shaft 90 bears several, for example, five propellers 130 which are arranged at equal distances along the shaft 90 and non-rotatably thereon and the axis of symmetry of which coincides with the axis of rotation 88.

As illustrated in FIG. 8, the propellers 130 can have, for example, four propeller blades 132 each which can conceivably have resulted in such a manner that a circular disk aligned at right angles to the axis of rotation 88 has been split each time into four sectors by radial cuts and the sectors have been twisted.

The propellers 130 are arranged along the shaft 90 such that propeller blades 132 of different propellers 130 which correspond to one another take up the same angular position with respect to the axis of rotation 88, i.e. coincide with one another when viewed in the direction parallel to the axis of rotation 88.

The shaft 90 and the propellers 130 together form a substrate member 102.

Several inlet bores for BHP 104 which penetrate the left side wall 72 at right angles to its surface and are arranged next to or above one another are provided in the left side wall 72, these inlet bores being connected to the liquid return line 50 via inlet pipes 106 and a branch pipe (not illustrated).

BHP flows through the inlet bores for BHP 104 into the liquid bath 118 in the lower region of the interior 92 of the reaction chamber 22. The propeller blades 132 located within the liquid bath 118 take up part of the momentum of the flow of liquid and transfer it to the substrate member 102 so that this rotates about the axis of rotation 88.

The propeller blades 132 of each propeller 130 thereby dip alternatingly into the liquid bath 118 and are wetted by the BHP so that when they emerge from the liquid bath 118 a thin film of liquid remains on the propeller blades 132.

The left side wall 72 has in its region located above the level of liquid 120 several inlet bores for chlorine gas 108 which pass through the surface of the left side wall 72 at right angles and are connected to the educt gas supply line 52 via inlet pipes 110 and a branch pipe (not illustrated). The inlet bores for chlorine gas 108 are thereby arranged at different radial distances from the axis of rotation 88 such that the propeller blades 132 of the propeller 130 closest to the left side wall 72 have chlorine gas blown evenly onto them.

The flow of chlorine gas is conveyed between the propeller blades 132 by means of these blades so that, in conjunction with the rotation of the substrate member 102 about the axis of rotation 88, the chlorine gas flows over all the propeller blades 132 of all the propellers 130, this leading to the boundary reaction specified above, during which electronically excited oxygen results.

As an alternative or supplementary to the arrangement of the inlet bores for chlorine gas 108 illustrated in FIG. 8, it can also be provided for the chlorine gas to be blown in through inlet bores in the cover 76, in the front side wall 68 or in the rear side wall 70 which are aligned essentially at right angles to the axis of rotation 88. Such a blowing in of the chlorine gas at right angles to the axis of rotation 88 can be more favorable than a blowing in parallel to the axis of rotation 88, particularly with a high flow rate of the chlorine gas.

A drop separator arranged in the outlet opening for oxygen gas 112 can be omitted in this embodiment. The drop separator 114 is also not absolutely necessary in the embodiments described above.

As for the rest, the fifth embodiment of the inventive generator 20 corresponds with respect to construction and function to the first embodiment illustrated in FIGS. 1 to 4.

Figure 9:
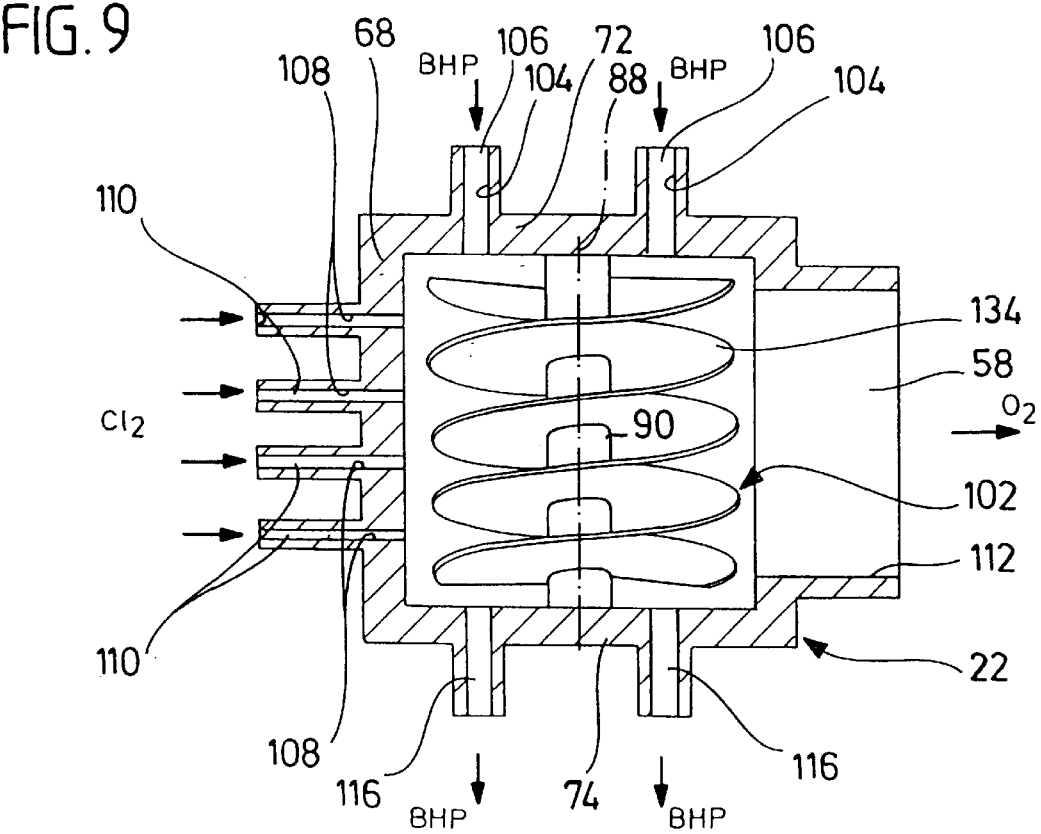
FIG. 9 is a cutaway plan view of the reaction chamber of a sixth embodiment of the inventive generator, the substrate member of which comprises a screw as momentum receiver.

A sixth embodiment of the inventive generator 20 for generating electronically excited oxygen which is illustrated in FIG. 9 in conjunction with FIG. 1 differs from the fifth embodiment illustrated in FIG. 8 in conjunction with FIG. 1 in that the substrate member 102 comprises instead of the propeller 130 a screw 134 which is non-rotatably connected to the shaft 90, the axis of which coincides with the axis of rotation 88 and which has several, for example, four windings.

Like the substrate member 102 of the fifth embodiment illustrated in FIG. 8, which is provided with propellers 130, the substrate member 102 of the sixth embodiment of the inventive generator 20 illustrated in FIG. 9 is also caused to rotate by a flow of BHP essentially parallel to the axis of rotation 88, whereby the respective parts of the screw 134 located in the liquid bath 118 act as momentum receivers.

The front side wall 68 is provided above the level of liquid 120 with inlet bores for chlorine gas 108 which pass through the surface of the front side wall 68 at right angles and are connected to the educt gas supply line 52 via inlet pipes 110 and a branch pipe (not illustrated). The chlorine gas flowing into the interior 92 of the reaction chamber 22 is conveyed over the entire surface of the screw 134 due to the windings of the screw 134, during the course of a complete rotation of the substrate member 102 about the axis of rotation 88. The reaction specified above, during which electronically excited oxygen results, takes place in the liquid film formed on the screw 134 as a result of it dipping into the liquid bath 118.

In the sixth embodiment of the inventive generator illustrated in FIG. 9, the outlet opening for oxygen gas 112 is arranged in the rear side wall 70 above the level of liquid 120 and extends over almost the entire width of the rear side wall 70.

As an alternative or supplementary to the inlet bores for chlorine gas 108 which are aligned at right angles to the surface of the front side wall 68 and the axis of rotation 88, inlet bores for chlorine gas can also be provided which are inclined at an angle corresponding to the pitch of the screw 134 in relation to planes at right angles to the axis of rotation 88.

It is particularly favorable when a number of inlet bores for chlorine gas 108 corresponding to the number of windings of the screw 134 are arranged at a distance next to one another corresponding to the axial spacing of the windings of the screw 134.

The right side wall 74 is penetrated at right angles to its surface by several overflow openings 116 which are connected to the liquid discharge line 24 via a pipe combination (not illustrated).

As for the rest, the sixth embodiment of the inventive generator 20 illustrated in FIG. 9 in conjunction with FIG. 1 corresponds with respect to construction and function to the fifth embodiment illustrated in FIG. 8 in conjunction with FIG. 1.

Figure 10:
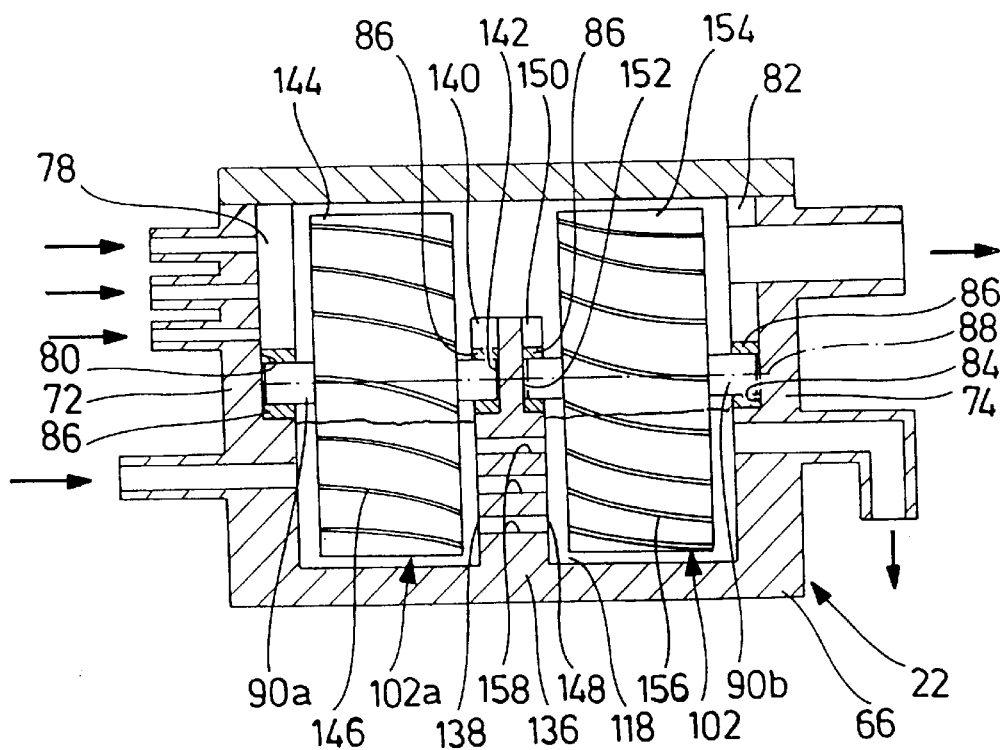
FIG. 10 is a section similar to FIG. 2 through the reaction chamber of a seventh embodiment of the inventive generator which comprises two substrate members rotating in opposite directions to one another.

The seventh embodiment of the inventive generator 20 for generating electronically excited oxygen which is illustrated in FIG. 10 in conjunction with FIG. 1 differs from the fifth embodiment illustrated in FIG. 8 in conjunction with FIG. 1 in that two substrate members 102a and 102b rotating in opposite directions are provided.

In the seventh embodiment, the base 66 of the reaction chamber 22 bears in the center of its upper side a parallelepiped-shaped supporting column 136, the surfaces of which are aligned parallel to the side walls 68, 70, 72, 74 and to the cover 76 of the reaction chamber 22.

A left side face 138 of the supporting column 136 facing the left side wall 72 has a recess 140 with a rectangular cross section which extends from the center of the upper edge of the left side face 138 vertically downwards and opens into a semi-cylindrical end region 142 which is arranged opposite to the semi-cylindrical end region 80 in the left side wall 72 at the same height over the base 66 as this.

The semi-cylindrical end region 80 and the semi-cylindrical end region 142 bear bearing bushings 86, in each of which one end of a shaft 90a rotatable about the axis of rotation 88 is mounted.

A cylindrical roller 144 coaxial to the shaft 90a is non-rotatably connected thereto.

The roller 144 bears along its circumference guide vanes 146 which project radially therefrom, extend in axial direction over the entire length of the roller 144 and at the end of the roller 144 facing the left side wall 72 of the reaction chamber 22 are aligned parallel to the axis of rotation, towards the end of the roller 144 facing away from the left side wall 72, however, are increasingly turned in relation to the axis of rotation 88.

The angle, through which the guide vanes 146 are turned in relation to the axis of rotation 88, determines the rotational speed of the roller 144 as a function of the flow rate of the BHP in the liquid bath 118.

A right side face 148 of the supporting column 136 facing the right side wall 74 of the reaction chamber 22 likewise has in mirror image to the recess 140 and the semi-cylindrical end region 142 of the left side face 138 a recess 150 which opens into a semi-cylindrical end region 152.

The semi-cylindrical end region 84 in the right side wall 74 and the semi-cylindrical end region 152 in the right side face 148 of the supporting column 136 bear bearing bushings 86, in each of which one end of a shaft 90b rotatable about the axis of rotation 88 is mounted.

A cylindrical roller 154 coaxial to the shaft 90b is connected thereto.

The roller 154 bears along its circumference guide vanes 156 which project radially therefrom and extend in axial direction over the entire length of the roller 154. The guide vanes 156 have the same distance from one another as the guide vanes 146 of the roller 144 and are curved to the same degree but in the opposite direction so that the guide vanes 156 are turned through a maximum angle in relation to the axis of rotation 88 at the end of the roller 154 facing away from the right side wall 74 of the reaction chamber 22 and are aligned parallel to the axis of rotation 88 at the end of the roller 154 facing the right side wall 74.

The shaft 90a, the roller 144 and the guide vanes 146 together form a substrate member 102a. The shaft 90b, the roller 154 and the guide vanes 156 together form a substrate member 102b.

In addition, the supporting column 136 is penetrated by through channels 158 for the passage of BHP from the left side face 138 to the right side face 148 of the supporting column 136, these channels being aligned parallel to the axis of rotation 88.

In the seventh embodiment of the inventive generator 20 illustrated in FIG. 10, the left side wall 72 is provided with an inlet bore for BHP 104 which passes through this side wall at right angles to its surface and is arranged at approximately the same radial distance from the axis of rotation 88 as the guide vanes 146 of the roller 144.

The guide vanes 146 deflect the incoming BHP in the direction of the circumference of the roller 144 due to their curvature. The rebound momentum transferred from the flow of BHP to the guide vanes 146 thereby causes the substrate member 102a to rotate about the axis of rotation 88.

The BHP passing through the through channels 158 of the supporting column 136 or around the same as far as the roller 154 is deflected by the guide vanes 156 of the roller 154, as a result of their curvature, in the opposite direction to the guide vanes 146 of the roller 144. Therefore, the rebound momentum received by the guide vanes 156 of the roller 154 causes the substrate member 102b to rotate about the axis of rotation 88 in the opposite direction to the rotation of the substrate member 102a.

The left side wall 72 of the reaction chamber 22 is penetrated by several inlet bores for chlorine gas 108 at right angles to its surface, these bores being arranged above the level of liquid 120 and having approximately the same radial distance from the axis of rotation 88 as the guide vanes 146.

The inlet bores for chlorine gas 108 are connected to the educt gas supply line 52 via inlet pipes 110 and a branch pipe (not illustrated).

The chlorine gas flowing through the inlet bores for chlorine gas 108 into the reaction chamber 22 parallel to the axis of rotation 88 is directed by the guide vanes 146 over the cylindrical surface of the roller 144 and is thereby given, as a result of the curvature of the guide vanes 146, a speed component in the direction of the circumference of the roller 144.

If the chlorine gas and the oxygen gas formed on the surface of the substrate member 102a passes on as far as the roller 154, it experiences an additional speed alteration in the direction of the circumference of the roller 154, as a result of the curvature of the guide vanes 156 of the roller 154 in the opposite direction, and this is contrary to the first speed alteration due to the guide vanes 146 and approximately of the same magnitude.

Therefore, the flow of gas exiting into the flow channel 58 through the outlet opening for oxygen gas 112 and consisting primarily of electronically excited oxygen gas essentially no longer has a speed component which is aligned transversely to the axis of rotation 88 and, therefore, transversely to the flow channel 58. This is beneficial for the formation of a desirably uniform flow of gas in the flow channel 58.

Instead of an arrangement with two substrate members 102a, 102b rotating in opposite directions, arrangements are also possible with a larger number of substrate members, of which two substrate members rotate each time in opposite directions.

As for the rest, the seventh embodiment of the inventive generator 20 illustrated in FIG. 10 in conjunction with FIG. 1 corresponds with respect to construction and function to the fifth embodiment illustrated in FIG. 8 in conjunction with FIG. 1.

The arrangements of the inlet bores for chlorine gas 108 and the outlet opening for oxygen gas 112 as specified for the embodiments of the inventive generator described in the above represent preferred arrangements. Alternatively or supplementary thereto, arrangements of the inlet bores for chlorine gas 108 or the outlet opening for oxygen gas 112 described in conjunction with other embodiments can also be provided.

We claim:

1. A generator for generating a product gas from a chemical reaction between an educt gas and a liquid, comprising:

a closed reaction chamber with a liquid supply, a liquid discharge, and an educt gas supply;

a product gas discharge;

a liquid bath arranged within the reaction chamber;

a substrate member arranged for rotation about an axis of rotation in the reaction chamber;

the axis of rotation being arranged such that during a rotation of the substrate member, at least part of a surface of the substrate member alternatingly dips into the liquid bath and emerges from the liquid bath wetted by the liquid;

said liquid wetting said surface being adapted to react with the educt gas to form the product gas;

the substrate member comprising at least one momentum receiver; and a flow generator for generating a continuous flow of the liquid in the liquid bath, wherein:

said at least one momentum receiver receives at least part of the momentum of the flow of the liquid in the liquid bath for use in generating a rotary motion of the substrate member about the axis of rotation.

2. The generator as defined in claim 1, further comprising:

a device for generating a continuous flow of the educt gas in the reaction chamber.

3. The generator as defined in claim 2, wherein:

the substrate member comprises at least one deflecting element for deflecting the flow of the educt gas onto the surface of the substrate member.

4. The generator as defined in claim 2, wherein:

the deflecting element or elements direct the flow of the educt gas essentially over the entire surface of the substrate member that emerges from the liquid bath wetted by the liquid.

5. The generator as defined in claim 3, wherein:

the momentum receivers are designed to deflect the flow of the educt gas onto the surface of the substrate member.

6. The generator as defined in claim 1, wherein:

the substrate member comprises at least one deflecting element for deflecting a flow of the product gas towards the product gas discharge.

7. The generator as defined in claim 6, wherein:

the momentum receiver or receivers are designed to deflect a flow of the product gas towards the product gas discharge.

8. The generator as defined in claim 1, wherein:

a shape of an interior of the reaction chamber above the liquid bath arranged within the reaction chamber conforms to a shape of the substrate member.

9. The generator as defined in claim 1, wherein:

the substrate member comprises an essentially cylindrical roller.

10. The generator as defined in claim 1, wherein:

the substrate member comprises disks aligned transversely to said axis of rotation.

11. The generator as defined in claim 1, wherein:

the substrate member comprises a plurality of bristles.

12. The generator as defined in claim 1, wherein:

the momentum receiver comprises at least one guide vane.

13. The generator as defined in claim 12, wherein:

the guide vanes are curved.

14. The generator as defined in claim 1, wherein:

the momentum receiver comprises at least one propeller.

15. The generator as defined in claim 14, wherein:

an axis of symmetry of the propeller is aligned essentially parallel to a direction of the flow of the liquid in the reaction chamber.

16. The generator as defined in claim 1, wherein:

the momentum receiver comprises a screw.

17. The generator as defined in claim 16, wherein:

an axis of the screw is aligned essentially parallel to the axis of rotation of the substrate member and parallel to a direction of the flow of the liquid in the reaction chamber.

18. The generator as defined in claim 1, further comprising:

a device for generating a flow of the educt gas entering the reaction chamber essentially parallel to the axis of rotation of the substrate member.

19. The generator as defined in claim 1, further comprising:

a device for generating a flow of the educt gas entering the reaction chamber essentially transversely to the axis of rotation of the substrate member.

20. The generator as defined in claim 1, further comprising:

a plurality of substrate members arranged for rotation in the reaction chamber.

21. The generator as defined in claim 20, further comprising:

at least two substrate members with respective axes of rotation parallel to one another.

22. The generator as defined in claim 21, wherein:

the substrate members with respective axes of rotation parallel to one another comprise respective momentum receivers for generating a rotation of the substrate members in the same direction.

23. The generator as defined in claim 20, wherein:

said two substrate members with axes of rotation parallel to one another comprise momentum receivers for generating a rotation of the substrate members in opposite directions.

24. The generator as defined in claim 23, further comprising:

a device for generating a continuous flow of the educt gas in the reaction chamber; wherein:

the substrate members rotating in opposite directions each comprise at least one deflecting element for deflecting the gas flow; and said deflecting elements are designed such that the deflecting element or elements of one of said substrate members impart to the gas flow a deflection momentum directed contrary to a deflection momentum imparted to the gas flow by the deflecting element or elements of the other of said substrate members.

25. The generator as defined in claim 1, wherein:

said educt gas supply comprises chlorine gas;

said liquid comprises hydrogen peroxide dissolved in lye; and said product gas discharge comprises an electronically excited oxygen gas formed from a chemical reaction between the chlorine gas and the hydrogen peroxide dissolved in lye.

26. A process for generating a product gas from a chemical reaction between an educt gas and a liquid, comprising the steps of:

supplying the educt gas and the liquid to a closed reaction chamber;

removing the product gas and the liquid from said closed reaction chamber;

providing a liquid bath of said liquid in said closed reaction chamber;

providing a rotatable substrate member in the reaction chamber;

generating a continuous flow of the liquid in the liquid bath; and arranging at least one momentum receiver on the substrate member part to receive a momentum of the flow of the liquid in the liquid bath to cause said substrate member to rotate about an axis of rotation thereof such that, during a rotation of the substrate member, at least part of a surface of the substrate member alternatingly dips into the liquid bath and emerges from the liquid bath wetted by the liquid, thereby allowing the liquid wetting the surface to react with said educt gas to form said product gas.

27. The process as defined in claim 26, wherein:

a continuous flow of the educt gas in the reaction chamber is generated.

28. The process as defined in claim 27, wherein:

the flow of the educt gas is deflected onto the surface of the substrate member by at least one deflecting element arranged on the substrate member.

29. The process as defined in claim 28, wherein:

the deflecting element or elements direct the flow of the educt gas essentially over the entire surface of the substrate member that emerges from the liquid bath wetted by the liquid.

30. The process as defined in claim 28, wherein:

the flow of the educt gas is deflected onto the surface of the substrate member by the momentum receiver or receivers.

31. The process as defined in claim 26, wherein:

a flow of the product gas is deflected out of the reaction chamber by at least one deflecting element arranged on the substrate member.

32. The process as defined in claim 31, wherein:

the flow of the product gas is deflected out of the reaction chamber by the momentum receiver or receivers.

33. The process as defined in claim 26, wherein:

the educt gas is blown into the reaction chamber essentially parallel to the axis of rotation of the substrate member.

34. The process as defined in claim 26, wherein:

the educt gas is blown into the reaction chamber essentially transversely to the axis of rotation of the substrate member.

35. The process as defined in claim 26, wherein:

several substrate members arranged in the reaction chamber are caused to rotate by means of the flow of the liquid.

36. The process as defined in claim 35, wherein:

at least two substrate members with respective axes of rotation parallel to one another are caused to rotate.

37. The process as defined in claim 36, wherein:

two substrate members with respective axes of rotation parallel to one another are caused to rotate in the same direction.

38. The process as defined in claim 36, wherein:

said two substrate members with respective axes of rotation parallel to one another are caused to rotate in opposite directions.

39. The process as defined in claim 38, wherein:

a flow of the educt gas is generated in the reaction chamber; and a deflection momentum is imparted to the gas flow by at least one deflecting element arranged on one of said substrate members;

said deflection momentum being directed contrary to a deflection momentum imparted to the gas flow by at least one deflecting element arranged on the other of said substrate members.

40. The process as defined in claim 26 for generating an electronically excited oxygen gas, wherein:

said educt gas supply comprises chlorine gas;

said liquid comprises hydrogen peroxide dissolved in lye; and said product gas comprises said electronically excited oxygen gas and is formed from a chemical reaction between the chlorine gas and the hydrogen peroxide dissolved in lye.

41. A chemically pumped oxygen-iodine laser system operated with excitation energy transferred from an electronically excited oxygen gas to iodine atoms, comprising:

a generator for generating the electronically excited oxygen gas as a product gas from a chemical reaction between an educt gas and a liquid, said generator comprising:

a closed reaction chamber with a liquid supply, a liquid discharge, and an educt gas supply;

a product gas discharge;

a liquid bath arranged within the reaction chamber;

a substrate member arranged for rotation about an axis of rotation in the reaction chamber;

the axis of rotation being arranged such that during a rotation of the substrate member, at least part of a surface of the substrate member alternatingly dips into the liquid bath and emerges from the liquid bath wetted by the liquid, said liquid wetting said surface being adapted to react with the educt gas to form the product gas;

the substrate member comprising at least one momentum receiver; and a flow generator for generating a continuous flow of the liquid in the liquid bath, wherein:

said at least one momentum receiver receives at least part of the momentum of the flow of the liquid for use in generating a rotary motion of the substrate member about the axis of rotation.

* * * * *